United States Patent
Butler et al.

(10) Patent No.: US 6,687,093 B1
(45) Date of Patent: Feb. 3, 2004

(54) HEAD STACK ASSEMBLY SHIPPING COMB WITH TEMPORARY LOCATING FEATURE FOR INTERNAL HEAD DISK ASSEMBLY BUILD PROCESS AND DISK DRIVE MANUFACTURED USING THE SAME

(75) Inventors: Walter W. Butler, Scotts Valley, CA (US); Chunjer C. Cheng, Saratoga, CA (US); R. Mark Watson, Mesa, AZ (US); Charles E. Ketchu, Gilroy, CA (US); Jules Moritz, Jr., Gilroy, CA (US); Robert E. Lloyd, Livermore, CA (US); Craig W. Congdon, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 294 days.

(21) Appl. No.: 09/871,852

(22) Filed: May 31, 2001

(51) Int. Cl.[7] .................................................. G11B 5/54
(52) U.S. Cl. .................................................. 360/265.7
(58) Field of Search ........................ 360/265.7, 265.9, 360/266.1; 29/704

(56) References Cited

U.S. PATENT DOCUMENTS

| | | | |
|---|---|---|---|
| 4,862,584 A | 9/1989 | Budy et al. |
| 5,119,537 A | 6/1992 | Hamanaka et al. |
| 5,465,476 A | 11/1995 | Krajec et al. |
| 5,482,164 A | 1/1996 | Karns |
| 5,655,285 A | 8/1997 | Bonn et al. |

*Primary Examiner*—George J. Letscher
(74) *Attorney, Agent, or Firm*—Won Tae C. Kim, Esq.; Milad G. Shara, Esq.; Alan W. Young, Esq.

(57) ABSTRACT

Disclosed herein is a disk drive that includes a housing including a base, the base defining a blind receptacle, a spindle motor attached to the base, a disk mounted to the spindle motor and a head stack assembly pivotally coupled to the base. The head stack assembly includes a body portion including a first bore defining a pivot axis, an actuator arm cantilevered from the body portion, and a head gimbal assembly supported at the actuator arm and including a head. The base defines a blind receptacle and the actuator arm defines a second bore that is situated so as to enable the second bore and the blind receptacle to align along an axis parallel to the pivot axis when the head stack assembly is pivoted such that the head is not over the disk.

7 Claims, 6 Drawing Sheets

```
┌─────────────────────────────────────┐
│ PROVIDE HEAD STACK STRUCTURE THAT   │ S1
│ INCLUDES A HEAD STACK ASSEMBLY      │
│ AND A SHIPPING COMB INCLUDING AN    │
│ EXTENDED PIN FEATURE                │
└─────────────────────────────────────┘
                 │
                 ▼
┌─────────────────────────────────────┐
│ INSTALL HEAD STACK STRUCTURE TO     │ S2
│ THE BASE OF THE HEAD DISK ASSEMBLY  │
│ SUCH THAT EXTENDED PIN FEATURE      │
│ EXTENDS INTO BLIND RECPTACLE        │
│ DEFINED INTO BASE                   │
└─────────────────────────────────────┘
                 │
                 ▼
┌─────────────────────────────────────┐
│ ENGAGE MERGE COMB INTO HEAD         │ S3
│ STACK STRUCTURE                     │
└─────────────────────────────────────┘
                 │
                 ▼
┌─────────────────────────────────────┐
│ REMOVE SHIPPING COMB FROM HEAD      │ S4
│ STACK STRUCTURE                     │
└─────────────────────────────────────┘
```

*FIG. 7*

HEAD STACK ASSEMBLY SHIPPING COMB WITH TEMPORARY LOCATING FEATURE FOR INTERNAL HEAD DISK ASSEMBLY BUILD PROCESS AND DISK DRIVE MANUFACTURED USING THE SAME

BACKGROUND OF THE INVENTION

1. Field of the Invention

The present invention relates to disk drives. More particularly, the present invention relates to disk drives and methods for manufacturing disk drives.

2. Description of the Prior Art

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a head with at least one transducer for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the head toward the disk; and (3) a flex cable assembly that provides an electrical interconnect with minimal constraint on movement.

A typical HGA includes a load beam, a gimbal attached to an end of the load beam, and a head attached to the gimbal. The load beam has a spring function that provides a "gram load" biasing force and a hinge function that permits the head to follow the surface contour of the spinning disk. The load beam has an actuator end that connects to the actuator arm and a gimbal end that connects to the gimbal that carries the head and transmits the gram load biasing force to the head to "load" the head against the disk. A rapidly spinning disk develops a laminar airflow above its surface that lifts the head away from the disk in opposition to the gram load biasing force. The head is said to be "flying" over the disk when in this state.

Within the HDA, the spindle motor rotates the disk or disks, which are the media to and from which the data signals are transmitted via the/head on the gimbal attached to the load beam. The transfer rate of the data signals is a function of rotational speed of the spindle motor; the faster the rotational speed, the higher the transfer rate. A spindle motor is essentially an electro-magnetic device in which the electromagnetic poles of a stator are switched on & off in a given sequence to drive a hub or a shaft in rotation, the hub including a permanent magnetic ring.

FIG. 1 shows the principal components of a magnetic disk drive 100 constructed in accordance with the prior art. With reference to FIG. 1, the disk drive 100 is an Integrated Drive Electronics (IDE) drive comprising a HDA 144 and a PCBA 114. The HDA 144 includes a base 116 and a cover 117 attached to the base 116 that collectively house a disk stack 123 that includes a plurality of magnetic disks (of which only a first disk 111 and a second disk 112 are shown in FIG. 1), a spindle motor 113 attached to the base 116 for rotating the disk stack 123, an HSA 120, and a pivot bearing cartridge 184 (such as a stainless steel pivot bearing cartridge, for example) that rotatably supports the HSA 120 on the base 116. The spindle motor 113 rotates the disk stack 123 at a constant angular velocity about a spindle motor rotation axis 175. The HSA 120 comprises a swing-type or rotary actuator assembly 130, at least one HGA 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 with a head. The flex cable assembly 180 includes a flex circuit cable and a flex clamp 159. The HSA 120 is pivotally secured to the base 116 via the pivot-bearing cartridge 184 so that the head at the distal end of the HGA 110 may be moved over a recording surface of the disks 111, 112. The pivot-bearing cartridge 184 enables the HSA 120 to pivot about a pivot axis, shown in FIG. 1 at reference numeral 182. The storage capacity of the HDA 111 may be increased by including additional disks in the disk stack 123 and by an HSA 120 having a vertical stack of HGAs 110 supported by multiple actuator arms 160.

According to the prior art, the HSA 120 is shipped together with a conventional shipping comb that separates and protects the heads during the shipping of the HSA 120 and prior to the integration of the HSA 120 in the HDA 144. The combination of the HSA 120 and the conventional shipping comb is conventionally installed into the base 116 of the HDA 144 and held in position away from the disk stack 123 by means of a device such as a temporary pin 190. This temporary pin 190 is typically inserted through a hole 192 defined at least in the top VCM plate 170 and through a hole (or slot) 194 defined in the overmolding of the coil portion 150 of the VCM. This immobilizes the HSA 120 and keeps the heads clear of the disks 112, 111. After the HSA 120 is secured to the baseplate 116, a merge comb (not shown) is inserted between the suspensions of the HSA 120 to spread the heads with sufficient clearance to enable them to be safely merged onto the disk(s) 111, 112. Once the merge comb is positioned, the conventional shipping comb and the temporary pin 190 are removed so that the heads may be merged onto the disk(s) 111, 112.

The use of the temporary pin 190, however, brings about a number of problems. Such problems include, for example, extra part handling during the assembly process by the production operator. Such extra handling may equate to about three seconds of lost throughput for each drive built. Competitive pressures in the disk drive industry drive continue to drive storage prices downward and three seconds of lost throughput per drive represents a non-trivial cost, when aggregated over a large volume of drives. Other disadvantages associated with the temporary pin 190 include the finite reusable lifespan thereof and the cost of the mold used to manufacture the pin 190, as well as the cost of the pin 190. There is also a danger that the temporary pin 190 may be inadvertently left in place during the merge operation, with catastrophic results for the HDA 144. Indeed, if the pin 190 is left in place as the merge operation is performed, the HDA 144 and/or HSA 120 may be damaged, as may be the assembly tooling. In addition, the presence of the temporary pin 190 may cause foreign object damage or a back end test failure of the HDA 144.

What is needed, therefore is an alternative to the use of the temporary pin 190 during the HDA assembly process. What are also needed are less costly methods of manufacturing disk drives and disk drives that are not prone to the actual and potential problems associated with the use of such temporary pins 190.

SUMMARY OF THE INVENTION

Accordingly, this invention may be regarded as a method of making a head disk assembly, the head disk assembly including a base and a head stack assembly having a voice coil motor and a pair of load beams, each load beam having a head. The method comprises the steps of providing a head stack structure including a shipping comb positioned on the head stack assembly, the shipping comb including an extended pin feature and a shipping comb finger that is configured for insertion between the load beams to separate the heads; installing the head stack structure to the base such that the extended pin feature of the shipping comb extends into a blind receptacle defined into the base; engaging a merge comb having a merge comb finger into the head stack structure such that the merge comb finger is disposed between the load beams, and removing the shipping comb from the head stack structure.

The present invention is also a disk drive, comprising a housing including a base, the base defining a blind receptacle; a spindle motor attached to the base; a disk mounted to the spindle motor; a head stack assembly pivotally coupled to the base and comprising a body portion including a first bore defining a pivot axis; an actuator arm cantilevered from the body portion, and a head gimbal assembly supported at the actuator arm and including a head. The actuator arm defines a second bore that is situated so as to enable the second bore and the blind receptacle to align along an axis parallel to the pivot axis when the head stack assembly is pivoted such that the head is not over the disk.

The blind receptacle may be cast into the base. The blind receptacle may be lined with a raised wall to provide additional engagement of the extended pin feature into the blind receptacle. The blind receptacle may be disposed adjacent a servo track push pin slot defined in the base. The second bore may be defined within the actuator arm at a position that is between the pivot axis and the head gimbal assembly. The second bore may be cylindrical.

The foregoing and other features of the invention are described in detail below and set forth in the appended claims.

BRIEF DESCRIPTION OF THE DRAWINGS

FIG. 7 is a flowchart of the method of making a head stack assembly according to the present invention.

DESCRIPTION OF THE PREFERRED EMBODIMENTS

Figure 1:
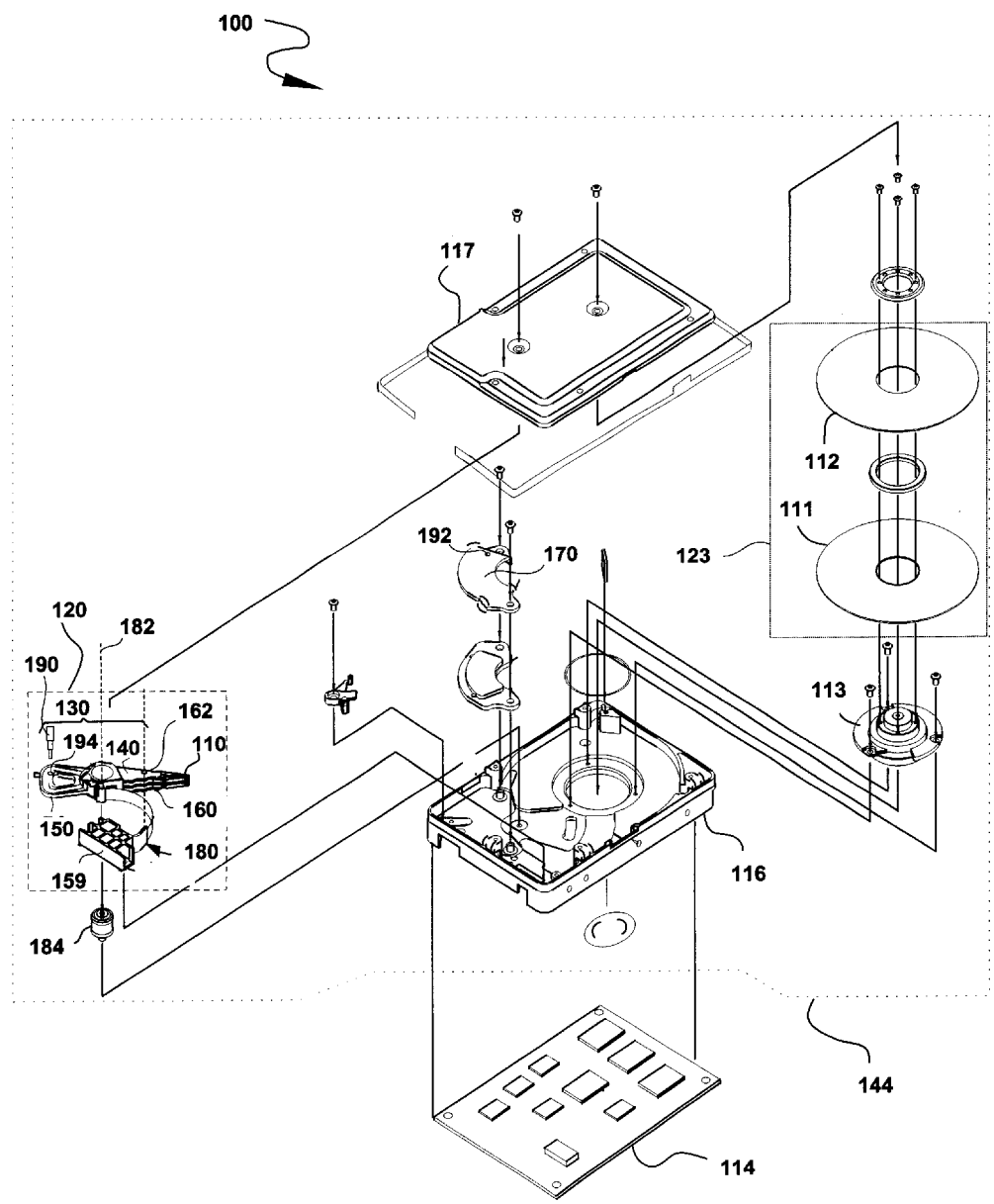
FIG. 1 is an exploded view of a conventional disk drive.
Figure 2:
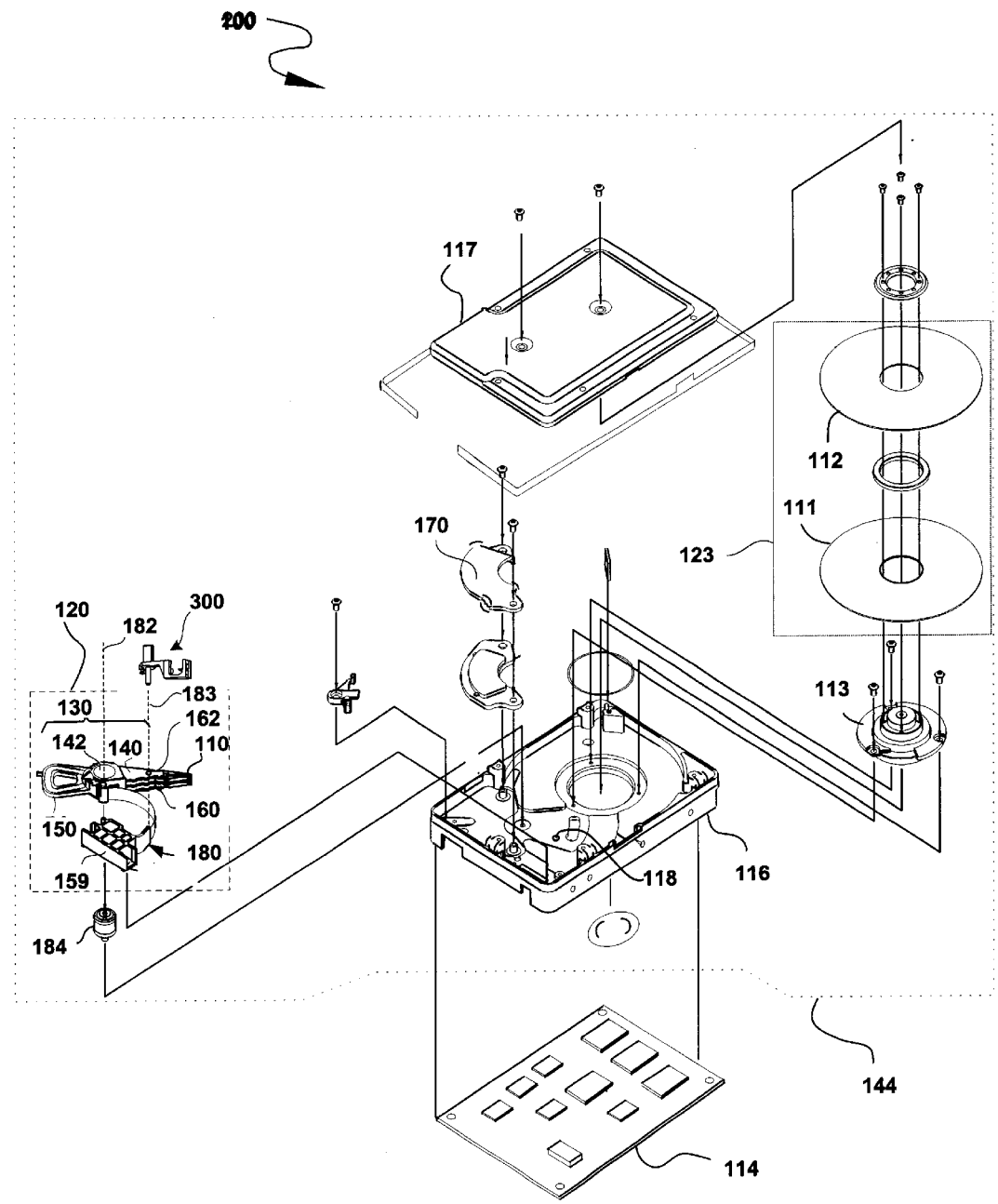
FIG. 2 is an exploded view of a disk drive according to the present invention.

FIG. 2 is an exploded view of a preferred disk drive 200 according to the present invention. FIG. 2 is similar to FIG. 1, but for the presence of the shipping comb 300 and the structures of the HSA 120, the top VCM plate 170 and the base 116 that enable the use of such a shipping comb 300. As these similar structures have been described in detail relative to FIG. 1, the description thereof is not repeated here. The HDA 144 according to the present invention includes a housing including a base 116 that defines a blind receptacle 118, which blind receptacle 118 is further described relative to FIGS. 5 and 6. A spindle motor 113 is attached to the base 116 and a disk 111, 112 is mounted to the spindle motor 113. AN HSA 120 is pivotally coupled to the base 116 and comprises a body portion 140 that includes a first bore 142 that defines a pivot axis 182. One or more actuator arms 160 are cantilevered from the body portion 140 and a HGA 110 is supported at each of the actuator arms 160 and includes a head for reading data from and writing data to the disk 111, 112. According to the present invention, the actuator arm(s) 160 define a second bore 162 (which may be cylindrically shaped, for example) that is situated so as to enable the second bore 162 and the blind receptacle 118 to align along an axis 183 that is parallel (or substantially parallel) to the pivot axis 182 when the HSA 120 is pivoted such that the head is not over the disk(s) 111, 112. The second bore may be defined within the actuator arm 160 at a position that is between the pivot axis 182 and the HGA 110. As shown in FIG. 2, no temporary pin 190 is used during the assembly of the disk drive 200 according to the present invention. In turn, doing away with the temporary pin 190 also obviates the need for machining a through hole in the in the top VCM plate 170 (such as shown at 192 in FIG. 1) or machining a through a hole (or slot) in the overmolding of the coil portion 150 of the VCM (as shown at 194 in FIG. 1). Doing so also solves or alleviates the problems and inefficiencies described above that are associated with the use of such a temporary pin 190.

Figure 3:
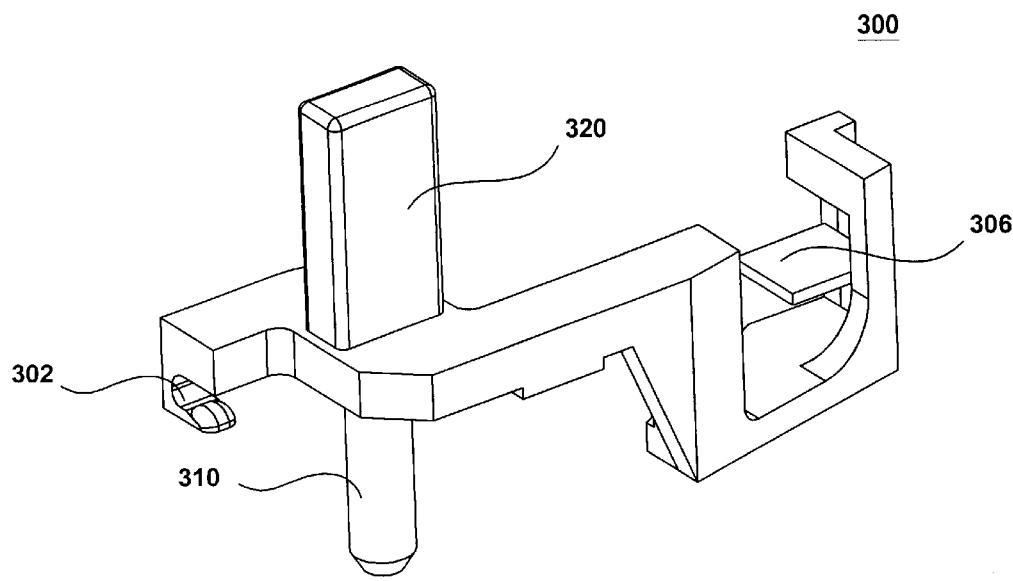
FIG. 3 is a first perspective view of a shipping comb according to the present invention.
Figure 4:
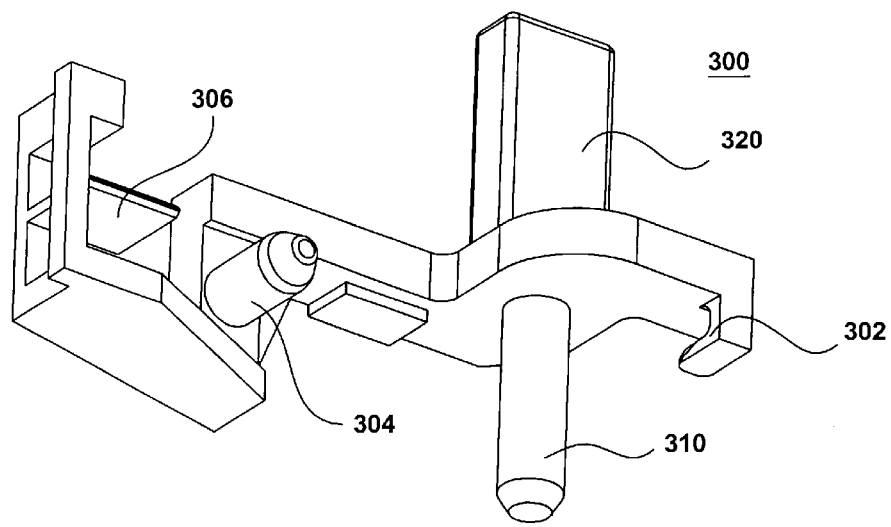
FIG. 4 is a second perspective view of a shipping comb according to the present invention.
Figure 5:
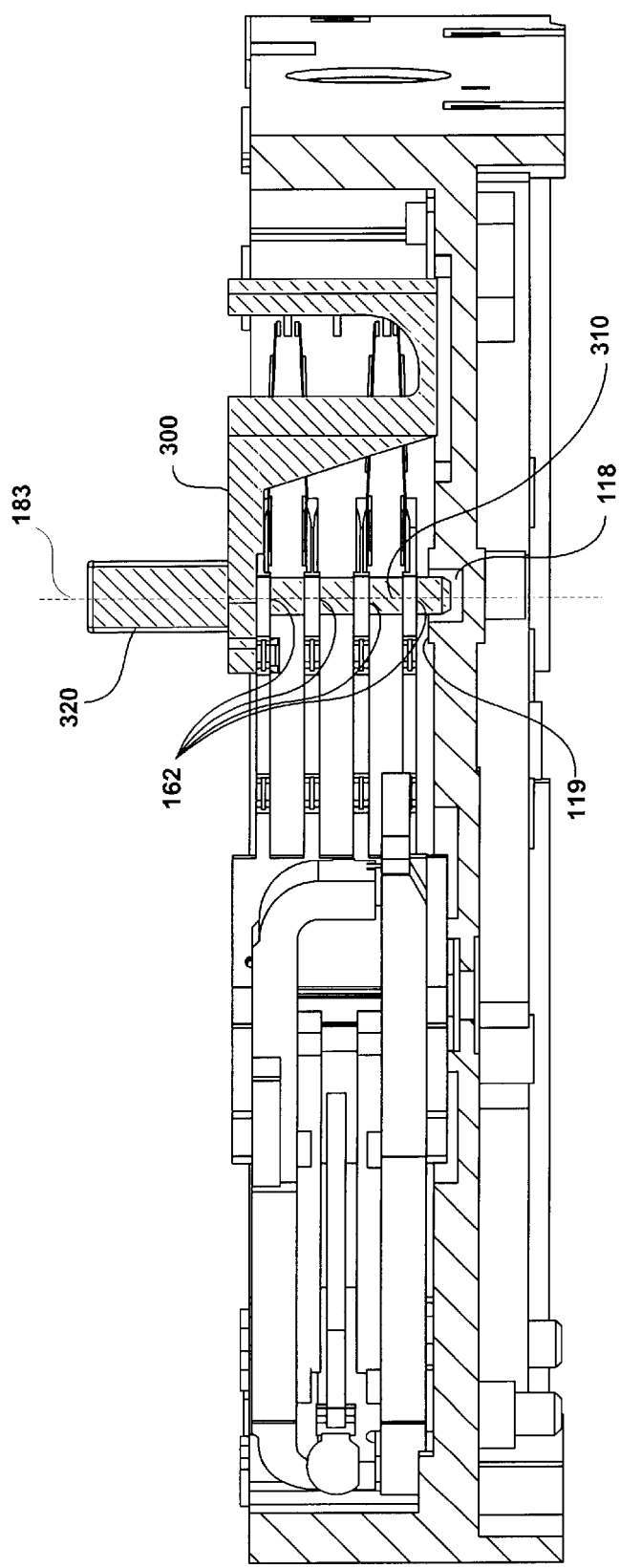
FIG. 5 is a cross sectional view of a head disk assembly in an intermediate stage of assembly, showing the shipping comb fitted to the head stack assembly, according to the present invention.

It is the structure of the shipping comb 300 that enables an efficient manufacture of the HDA 144 that does not resort to the use of a temporary pin, such as shown at 190 in FIG. 1. FIGS. 3 and 4 are perspective views of a shipping comb 300 according to the present invention. FIG. 5 is a cross sectional view of a head disk assembly in an intermediate stage of assembly, showing the shipping comb fitted to the head stack assembly, according to the present invention. Considering now FIGS. 3, 4 and 5 collectively, the shipping comb 300 includes a prehensile feature 320 that enables an operator to easily remove the shipping comb 300 from the HSA 120 after the merge process. The shipping comb 300 also includes a HGA separator 304 for separating the HGAs 110 coupled to the actuator assemblies 160 of the HSA 120. A shipping comb finger 306 is configured for insertion between the load beams of the HGA 110 to separate and protect the heads thereof.

According to the present invention, the shipping comb 300 includes an extended pin feature 310 that is configured to extend into the blind receptacle 118 defined into the base 116 of the HDA 144 when the head stack structure (defined herein as the combination of the HSA 120 and the shipping comb 300) is installed into the base 116, as shown in FIG. 5. To insert the shipping comb 300 into the HSA 120, the extended pin feature 310 is inserted into the second bore 162 defined within the actuator arm(s) 160 while the shipping comb 300 is in an orientation such that the HGA separator 304 and the pivot stop 302 are clear of the HGAs 110 and the actuator arms 160, respecively. When the extended pin feature 310 of the shipping comb 300 is fully engaged within the second bore 162, the shipping comb 300 may be pivoted until the pivot stop 302 contacts the edges of one of the actuator arms 160, causing the HGA separator 304 to separate the HGA 110 and the comb finger 306 interdigitate between the heads. Such a head stack structure may then be installed to the base 116 such that the extended pin feature 310 of the shipping comb 300 extends into the blind receptacle 118 defined into the base 116, in the manner shown in FIG. 5. As shown, the free end of the extended pin feature 310 may be chamfered to facilitate insertion thereof into the blind receptacle 118.

Figure 6:
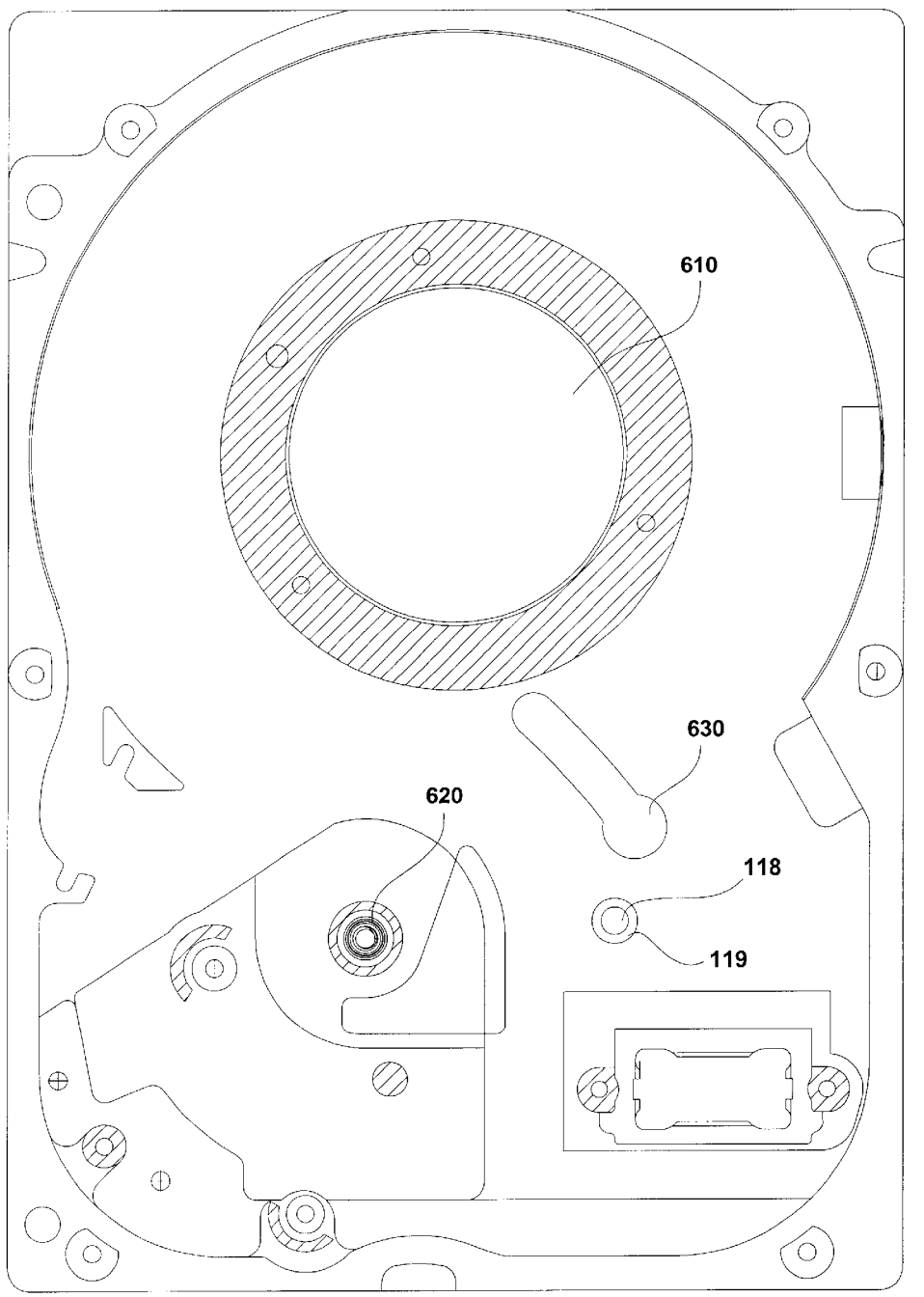
FIG. 6 is a top view of a head disk assembly base of a disk drive according to the present invention.

FIG. 6 is a top view of a head disk assembly base of a disk drive according to the present invention. For orientation purposes, the base 116 is configured to receive the spindle motor at 610 and is configured to receive the pivot bearing cartridge 184 at 620. As shown, the base 116 defines a blind receptacle 118, the blind receptacle 118 being disposed adjacent a servo track push pin slot 630, also defined in the base 116. More particularly, the second bore(s) 162 defined within the actuator arm(s) 110 and the blind receptacle 118 are mutually disposed so as to enable the second bore 162 and the blind receptacle 118 to align along an axis 183 that is parallel (or substantially parallel) to the pivot axis 182 when the HSA 120 is pivoted such that the head(s) is not over the disk. Such an alignment of the second bore(s) 162 and the blind receptacle 118 along the axis 183 is clearly shown in FIG. 5. As shown in both FIGS. 5 and 6, the blind receptacle 118 may be lined with a raised wall 119 to provide additional engagement of the extended pin feature 310 into the blind receptacle 118. The blind receptacle 118 may be cast into the base 116.

FIG. 7 is a flowchart of the method of making a head stack assembly according to the present invention. According to the present invention, the head stack structure is provided, the head stack structure including the shipping comb 300 and the HSA 120, as shown at step S1. The shipping comb 300, as detailed above, may include an extended pin feature 310 and a shipping comb finger 306 that is configured for insertion between the load beams of the HSA 120 to separate the heads thereof. As shown at S2, the head stack structure may then be installed onto the base 116 such that the extended pin feature 310 of the shipping comb 300 extends into the blind receptacle 118 defined into the base 116. A merge comb (not shown) having a merge comb finger may then be inserted into the head stack structure such that a merge comb finger thereof is disposed between the load beams, as shown at S3. The shipping comb 300 may then be removed from the head stack structure, as called for by step S4.

Significantly, the use of the shipping comb 300 during the drive assembly process enables an efficient and thus economical assembly of the HDA 144 and lowers the overall drive manufacturing costs.

What is claimed is:

1. A method of making a head disk assembly, the head disk assembly including a base and a head stack assembly having a voice coil motor and a pair of load beams, each load beam having a head, the method comprising the steps of:

providing a head stack structure including a shipping comb positioned on the head stack assembly, the shipping comb including an extended pin feature and a shipping comb finger that is configured for insertion between the load beams to separate the heads;

installing the head stack structure to the base such that the extended pin feature of the shipping comb extends into a blind receptacle defined into the base;

engaging a merge comb having a merge comb finger into the head stack structure such that the merge comb finger is disposed between the load beams, and removing the shipping comb from the head stack structure.

2. A disk drive, comprising:

a housing including a base, the base defining a blind receptacle;

a spindle motor attached to the base;

a disk mounted to the spindle motor;

a head stack assembly pivotally coupled to the base and comprising:
a body portion including a first bore defining a pivot axis;
an actuator arm cantilevered from the body portion, and
a head gimbal assembly supported at the actuator arm and including a head;

the actuator arm defining a second bore that is situated so as to enable the second bore and the blind receptacle to align along an axis parallel to the pivot axis when the head stack assembly is pivoted such that the head is not over the disk.

3. The disk drive of claim 2, wherein the blind receptacle is cast into the base.

4. The disk drive of claim 2, wherein the blind receptacle is lined with a raised wall to provide additional engagement of the extended pin feature into the blind receptacle.

5. The disk drive of claim 2, wherein the blind receptacle is disposed adjacent a servo track push pin slot defined in the base.

6. The disk drive of claim 2, wherein the second bore is defined within the actuator arm at a position that is between the pivot axis and the head gimbal assembly.

7. The disk drive of claim 6, wherein the second bore is cylindrical.

* * * * *